(12) United States Patent
Duling et al.

(10) Patent No.: US 7,196,840 B2
(45) Date of Patent: Mar. 27, 2007

(54) AMPLITUDE BALANCING FOR MULTILEVEL SIGNAL TRANSMISSION

(75) Inventors: Irl N. Duling, Lancaster, PA (US); Sandeep T. Vohra, Ellicott City, MD (US); Paul J. Matthews, Ellicott City, MD (US)

(73) Assignee: Broadband Royalty Corporation, Wilmington, DE (US)

( * ) Notice: Subject to any disclaimer, the term of this patent is extended or adjusted under 35 U.S.C. 154(b) by 178 days.

(21) Appl. No.: 10/303,050

(22) Filed: Nov. 25, 2002

(65) Prior Publication Data

US 2003/0147127 A1 Aug. 7, 2003

Related U.S. Application Data

(60) Provisional application No. 60/333,739, filed on Nov. 29, 2001.

(51) Int. Cl.
*H01S 4/00* (2006.01)
*H04B 10/12* (2006.01)

(52) U.S. Cl. ...................... 359/337; 359/333
(58) Field of Classification Search ............... 359/333, 359/337.1
See application file for complete search history.

(56) References Cited

U.S. PATENT DOCUMENTS

| | | | | |
|---|---|---|---|---|
| 5,905,838 A * | 5/1999 | Judy et al. | .................. | 385/123 |
| 6,151,160 A | 11/2000 | Ma | | |
| 6,259,555 B1 * | 7/2001 | Meli et al. | .................. | 359/337 |
| 6,356,384 B1 * | 3/2002 | Islam | .................. | 359/334 |
| 6,359,726 B1 * | 3/2002 | Onaka et al. | ............. | 359/337.1 |
| 6,396,623 B1 * | 5/2002 | Wysocki et al. | .......... | 359/337.4 |
| 6,421,155 B1 * | 7/2002 | Yano | .................. | 398/183 |
| 6,424,444 B1 * | 7/2002 | Kahn et al. | .................. | 398/141 |
| 6,483,636 B1 * | 11/2002 | Sugaya et al. | ............. | 359/349 |
| 6,532,103 B1 * | 3/2003 | Sakano et al. | ......... | 359/337.11 |
| 6,580,548 B2 * | 6/2003 | Islam | .................. | 359/334 |
| 6,592,274 B2 * | 7/2003 | Kahn et al. | .................. | 398/141 |
| 6,646,789 B2 * | 11/2003 | Kelkar et al. | ............. | 359/337.1 |
| 6,661,975 B1 * | 12/2003 | Hall et al. | .................. | 398/180 |
| 6,690,894 B2 * | 2/2004 | Ho et al. | .................. | 398/183 |
| 2001/0017724 A1 * | 8/2001 | Miyamoto et al. | .......... | 359/158 |
| 2002/0018268 A1 * | 2/2002 | Price et al. | .................. | 359/161 |
| 2002/0149839 A1 * | 10/2002 | Hamoir | .................. | 359/334 |
| 2003/0002113 A1 * | 1/2003 | Puc et al. | .................. | 359/161 |
| 2003/0095323 A1 * | 5/2003 | Onaka et al. | .................. | 359/334 |
| 2003/0152387 A1 * | 8/2003 | Duling et al. | .................. | 398/81 |
| 2004/0151512 A1 * | 8/2004 | Gill et al. | .................. | 398/183 |

FOREIGN PATENT DOCUMENTS

EP 0843199 A2 5/1996
JP 08 130561 A 5/1996

OTHER PUBLICATIONS

Aisawa et al., "A 1580-nm Band WDM transmission technology employing optical duobinary coding", Journal of Lightwave Technology, pp. 191-199, vol. 17, No. 2, Feb. 1999.*

* cited by examiner

*Primary Examiner*—Jack Keith
*Assistant Examiner*—Eric Bolda
(74) *Attorney, Agent, or Firm*—Charles A. Mirho; FSP LLC

(57) ABSTRACT

Arrangements are provided for an amplitude balanced optical amplifier. A combination of an optical preamplifier and a gain/loss variation modification device (VMD) is employed. The gain/loss VMD compensates the gain variation across different wavelength channels introduced by the preamplifier. The gain/loss VMD operates based on a gain/loss profile that is complementary to that of the preamplifier. More than one amplifier may be deployed. In addition, feedback control may be applied to either the preamplifier or the gain/loss VMD to dynamically control the performance.

20 Claims, 16 Drawing Sheets

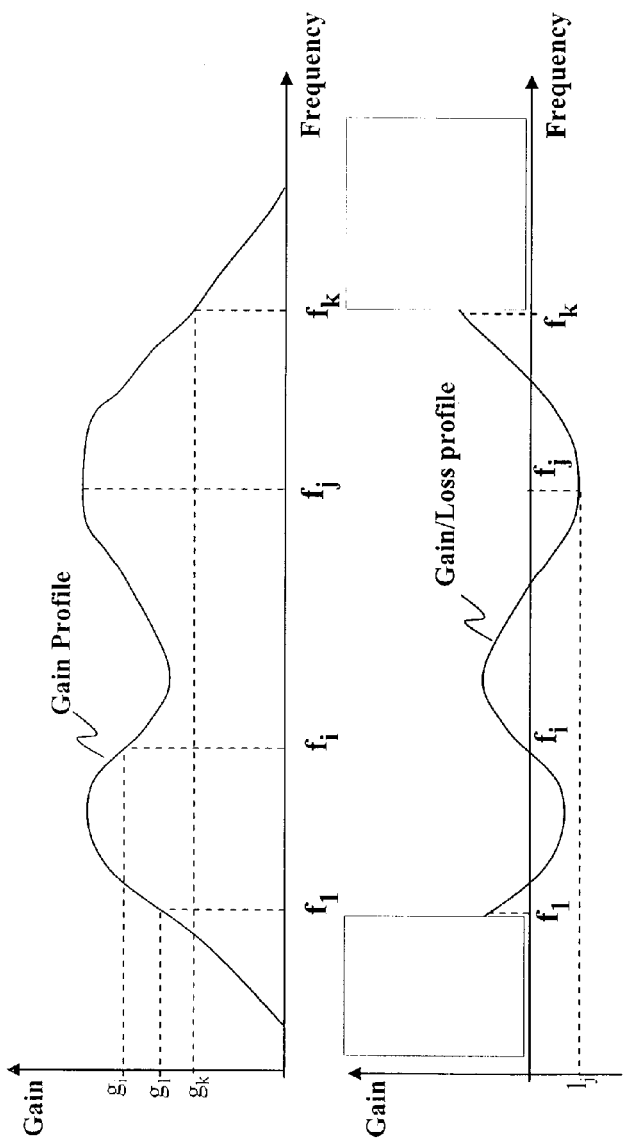
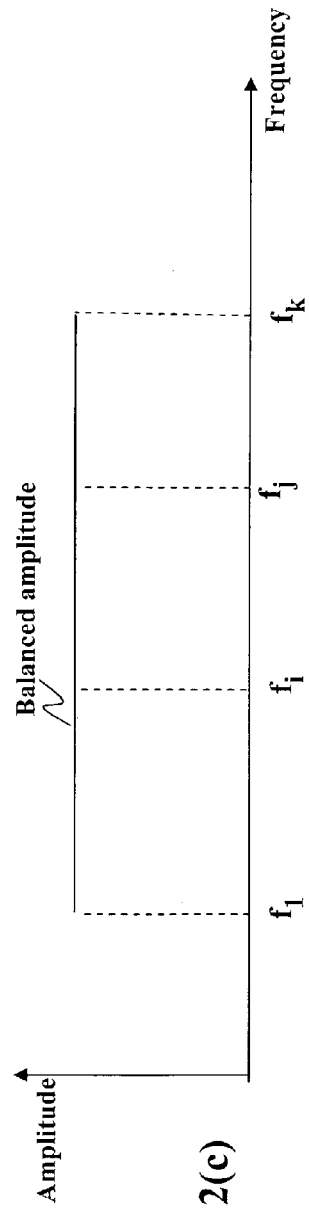
Fig. 2(a)
Fig. 2(b)
Fig. 2(c)

AMPLITUDE BALANCING FOR MULTILEVEL SIGNAL TRANSMISSION

This application is based on Provisional Application No. 60/333,739 filed Nov. 29, 2001, the entire contents of which is hereby incorporated by reference.

BACKGROUND

1. Field of Invention

The present invention relates to a device and method for use in information transmission via an optical fiber and an optical communication system incorporating the device. More specifically, the present invention relates to a device and method for transmitting multilevel and hybrid encoded information via an optical fiber and an optical communication system incorporating the device.

2. Discussion of Related Art

Demand for optical communication systems is growing with the growing demand for faster and more reliable broadband networks. Wavelength division multiplexing (WDM) is one technique used to increase the capacity of optical communication systems. Such optical communication systems include, but are not limited to, telecommunication systems, cable television systems (CATV), and local area networks (LANs). An introduction to the field of Optical Communications can be found in "Optical Communication Systems" by Gowar, ed. Prentice Hall, N.Y., 1993.

WDM optical communication systems carry multiple optical signal channels, each channel being assigned a different wavelength. Optical signal channels are generated, multiplexed to form an optical signal comprised of the individual optical signal channels, and transmitted over a single waveguide such as an optical fiber. The optical signal is subsequently demultiplexed such that each individual channel is routed to a designated receiver.

Information to be transmitted via an optical fiber may be encoded using different coding schemes, including on-off-keyed coding schemes and multilevel coding schemes. Both encoding schemes provide different signal levels to represent different symbols in the information stream. In the former case, the underlying information stream has only two symbols ("on" and "off"). In the latter case, more than two different signal levels are used to represent different symbols. Information encoded using different schemes may be transmitted as a single hybrid stream in the same wavelength channel. The optical signal to noise ratio required to transmit multilevel or hybrid signals is much higher than that required to transmit conventional on-off-keyed signals.

To transmit a large bandwidth of multilevel signals through an optical transmission line, multiple wavelengths can be used. Optical amplifiers may be needed to increase the propagation distance to more than what would be allowed by the natural attenuation of the fiber or of the components added to the communication channels to control the signal. The optical amplifiers increase the power of signals carried in different wavelength channels when such signals pass through the optical fiber.

When an optical amplifier amplifies an optical signal comprising more than one wavelength, variations in gain amplitude as a function of wavelength may lead to degradation of the signal performance in the channels with less power. This problem becomes more severe when multilevel or hybrid signals are present due to the fact that the signal to noise ratio requirement for multilevel signals is much higher than that for conventional on-off-keyed signals.

SUMMARY

In accordance with the present invention, an amplitude balanced (AB) optical amplifier is provided for transmitting multilevel encoded signals. The AB-optical amplifier amplifies an optical signal that comprises multiple wavelength channels and contains at least one multilevel encoded signal. The AB-optical amplifier may comprise one or more optical amplifiers and a gain/loss variation modification device (VMD). Each optical amplifier has a wavelength dependent gain profile. The gain/loss VMD operates based on a gain/loss profile that is complementary to a compound gain profile achieved by the optical amplifiers deployed. The AB-optical amplifier may also be dynamically controlled based on feedback. An adjustment to be made with respect to each wavelength channel may be determined according to a desired power level.

In one embodiment, an AB-optical amplifier comprises an optical preamplifier and a gain/loss VMD. Upon receiving a wavelength division multiplexed input optical signal, the preamplifier generates amplified signals with a gain variation across different wavelength channels. The gain/loss VMD reduces the gain variation by modifying the gains of the amplified signals across different wavelength channels based on a gain/loss profile that is complementary to the gain profile of the optical preamplifier.

In a different embodiment, an AB-optical amplifier comprises dual optical amplifiers and a gain/loss VMD. Two optical amplifiers and the gain/loss VMD forms a processing pipeline. An optical preamplifier has a first gain profile. It amplifies optical signals in different wavelength channels, generating pre-amplified signals with a gain variation across different wavelength channels. Such pre-amplified signals are then modified by the gain/loss VMD to reduce the gain variation. An optical post-amplifier further amplifies the output signals from the gain/loss VMD according to a second gain profile. The gain/loss VMD modifies the pre-amplified signals based on a gain/loss profile that is complementary to a compound gain profile achieved by both the optical preamplifier and the optical post-amplifier.

In another embodiment, an AB-optical amplifier has feedback control capability. In a preferred embodiment, the feedback control is based on the signal power level of each wavelength channel detected from the output of the AB-optical amplifier. The feedback control may be applied to an amplifier so that its gain with respect to different wavelength channels may be dynamically adjusted. Alternatively, the feedback control may also be applied to a gain/loss VMD to adjust its gain/loss with respect to the performance in each wavelength channel.

In another embodiment, a wavelength division multiplexed input optical signal is amplified using a plurality of AB-optical amplifiers, each of which may be realized in any one of the above described embodiments. The multiple AB-optical amplifiers may be deployed in parallel, processing optical signals in disjoint wavelength groups, wherein each wavelength group represents a portion of the input optical signal and includes a plurality of wavelength channels having at least one multilevel encoded signal. The input optical signal is first demultiplexed into different wavelength groups. Each AB-optical amplifier performs amplitude balanced amplification on signals contained in its associated wavelength group. Amplified signals corresponding to different wavelength groups are then multiplexed into an output optical signal.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar parts throughout the several views of the drawings, and wherein:

FIG. 2(a) illustrates a gain profile of an amplifier;

FIG. 2(b) illustrates a gain/loss profile of a gain/loss variation modification device (VMD);

FIG. 2(c) illustrates an uniform amplitude profile of an AB-optical amplifier;

DETAILED DESCRIPTION

The present invention relates to an amplitude balanced (AB) optical amplifier for multilevel signal transmission. Various embodiments of an AB-optical amplifier are discussed below. An AB-optical amplifier amplifies an optical signal carrying multiple wavelength channels that contain at least one multilevel encoded signal. The AB-optical amplifier may include one or more amplifiers and a gain/loss variation modification device (VMD). Each amplifier has a wavelength dependent gain profile. The gain/loss VMD operates based on a gain/loss profile that is complementary to a compound gain profile achieved by the amplifiers deployed. The AB-optical amplifier may also be dynamically adjusted via feedback control.

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, re-writable optical disks, and so on. For purposes of the disclosure herein, computer-readable media may comprise any form of data storage mechanism, including such existing memory technologies as well as hardware or circuit representations of such structures and of such data.

Figure 1:
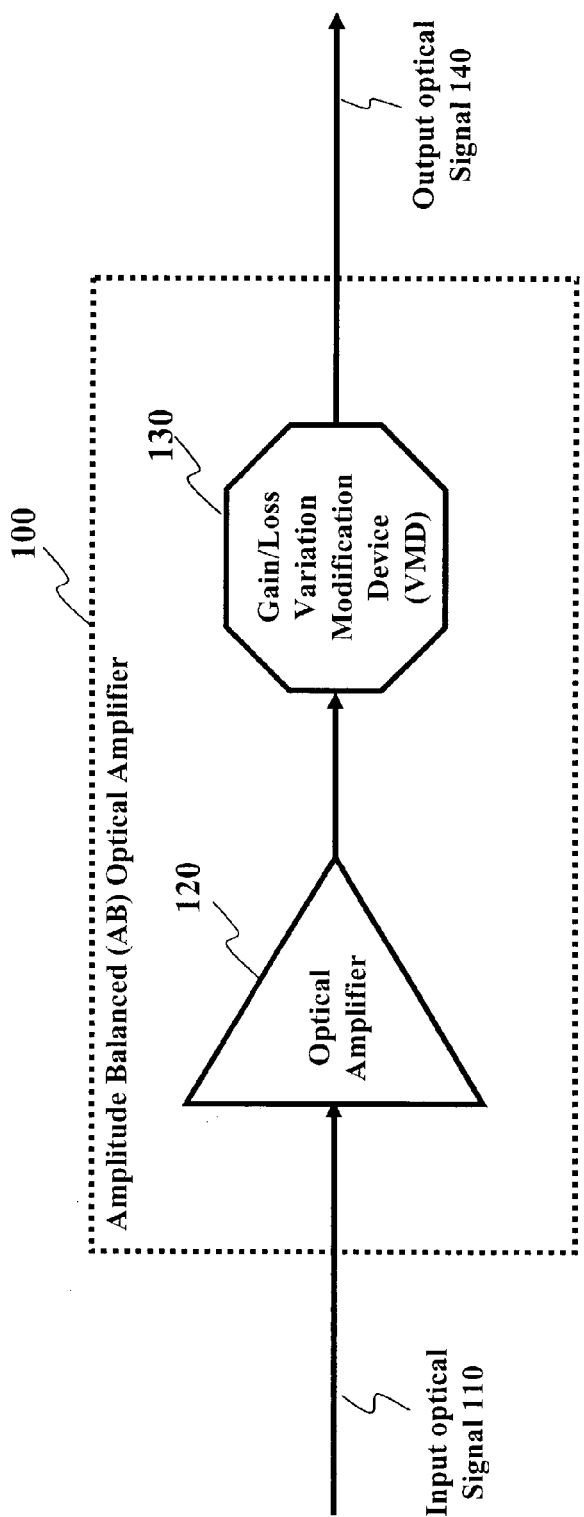
FIG. 1 depicts an exemplary architecture of an amplitude balanced (AB) optical amplifier, according to a first embodiment of the present invention.

FIG. 1 depicts an exemplary architecture of an AB-optical amplifier 100, according to a first embodiment of the present invention. The AB-optical amplifier comprises an amplifier 120 and a gain/loss variation modification device (VMD) 130. The amplifier 120 receives an input optical signal 110 and amplifies the signal. The amplified signal has gain variations across different wavelengths. The gain/loss VMD 130 modifies the gain variations present in the amplified signal and produces an output optical signal 140 that has reduced gain variations across different wavelengths.

The input optical signal carries a plurality of wavelength channels. Some of the wavelength channels may carry multilevel encoded signals. Multilevel signals refer to information that is encoded using different signal levels or phases that represent different symbols in the information stream. At one extreme, a multilevel signal with an infinite number of levels is an analog signal. At the other extreme, a signal with two levels representing "on" and "off" is the standard on-off-keyed signal. The optical signal-to-noise ratio required to transmit multilevel signals is much higher than what is required to transmit traditional on-off-keyed signals.

Some of the wavelength channels in the input optical signal 110 may also carry hybrid encoded signals. Hybrid signals refer to data streams that contain both multilevel and on-off-keyed traffic at the same time and carried on the same wavelength channel. When encoding hybrid signals, different traffic types (i.e., multilevel and on-off-keyed) may be first modulated onto different subcarriers at different frequencies. Such subcarriers may then be combined and subsequently up-converted onto a single wavelength channel. Similar to a multilevel signal, the optical signal to noise ratio required to transmit hybrid signals is much higher than what is required to transmit on-off-keyed signals.

When the input optical signal 110 comprises more than one wavelength channel, the amplitude gains with respect to different wavelengths may vary. This is due to the wavelength dependent characteristic of the amplifier 120. That is, the amplifier 120 may achieve different amplitude gain for each wavelength. This yields a gain variation across different wavelengths.

FIG. 2(a) illustrates an example gain profile of the amplifier 120. The X-axis represents frequencies and the Y-axis represents the amplitude gain. The curve in FIG. 2(a) represents the gain profile of the amplifier 120, which shows that at different frequencies, the amplitude gains are different. For example, at frequency $f_1$, the amplifier 120 achieves amplitude gain $g_1$; at frequency $f_j$, the amplifier 120 achieves a different amplitude gain $g_j$; at frequency $f_k$, the amplifier 120 achieves yet another different amplitude gain $g_k$. Such variation in amplitude gain is a function of wavelength.

To reduce the degradation caused by the gain variations, the gain/loss VMD 130 is designed to reduce or compensate the gain variations by, for example, offsetting the gains according to certain criterion. For instance, such a criterion may be a desired signal power level. In a preferred embodiment, the gain/loss VMD 130 may operate based on a gain/loss profile that is complementary to that of the amplifier 120. That is, at a particular frequency, if the amplifier 120 achieves more gain so that the amplified signal encoded at that frequency exceeds the desired power level, the gain/loss VMD 130 may introduce a loss to offset the extra gain and vice versa.

FIG. 2(*b*) shows an exemplary gain/loss profile that is complementary to the gain profile shown in FIG. 2(*b*). At any frequency, whether a positive (gain) or a negative (loss) gain should be introduced depends on both the desired power level and the characteristics of the amplifier 120 at this particular frequency. For example, with respect to the gain profile illustrated in FIG. 2(*a*), the gain/loss VMD 130 may be designed to introduce a positive gain at frequency $f_1$ if the gain achieved by the amplifier 120 leads to a power level lower than a desired signal power level. Similarly, at frequency $f_j$, if the gain achieved by the amplifier 120 leads to a power level higher than the desired level, the gain/loss VMD 130 introduces a loss at frequency $f_j$. Through such adjustments of gain with respect to different wavelengths, the gain/loss VMD 130 reduces the gain variations produced by the amplifier 120.

Ideally, this balancing operation produces output signals in different wavelength channels that have signal power at substantially the same level. This is illustrated in FIG. 2(*c*), where the X-axis represents the frequency and the Y-axis represents amplitude. The straight curve labeled as "balanced amplitude" represents (substantially) uniform amplitude or signal power level across different wavelengths, achieved by the combination of the amplifier 120 and the gain/loss VMD 130 operating according to the gain profile and the gain/loss profile illustrated in FIG. 2(*a*) and FIG. 2(*b*). That is, the AB-optical amplifier 100 experiences a substantially equal gain regardless of the underlying wavelength. In the case of multilevel or hybrid signals, this produces a uniform degradation of the signal-to-noise ratio across the multiple wavelength channels carrying the signals.

Figure 3:
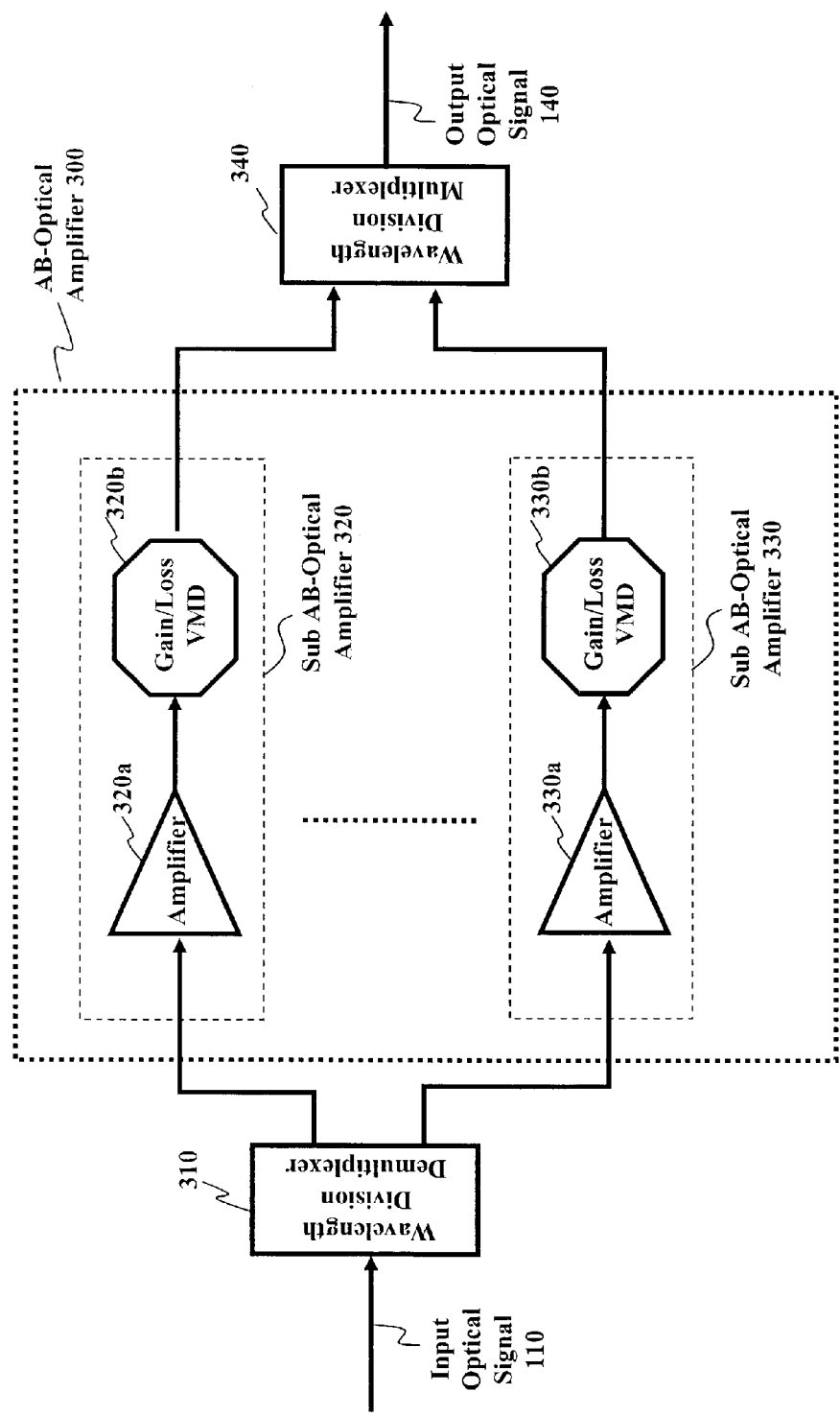
FIG. 3 depicts an exemplary architecture of an AB-optical amplifier, according to a second embodiment of the present invention.
Figure 4A:
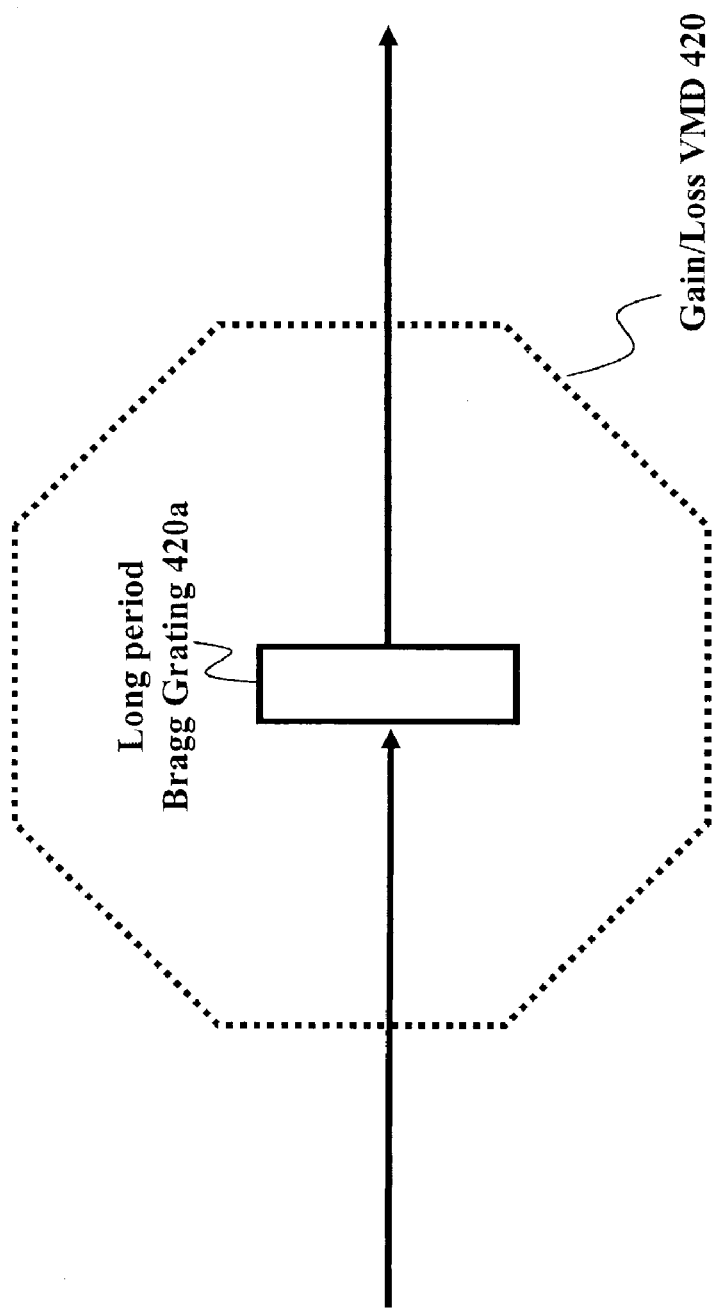
FIGS. 4(a)–4(d) show different exemplary realizations of a gain/loss VMD, according to embodiments of the present invention.
Figure 4B:
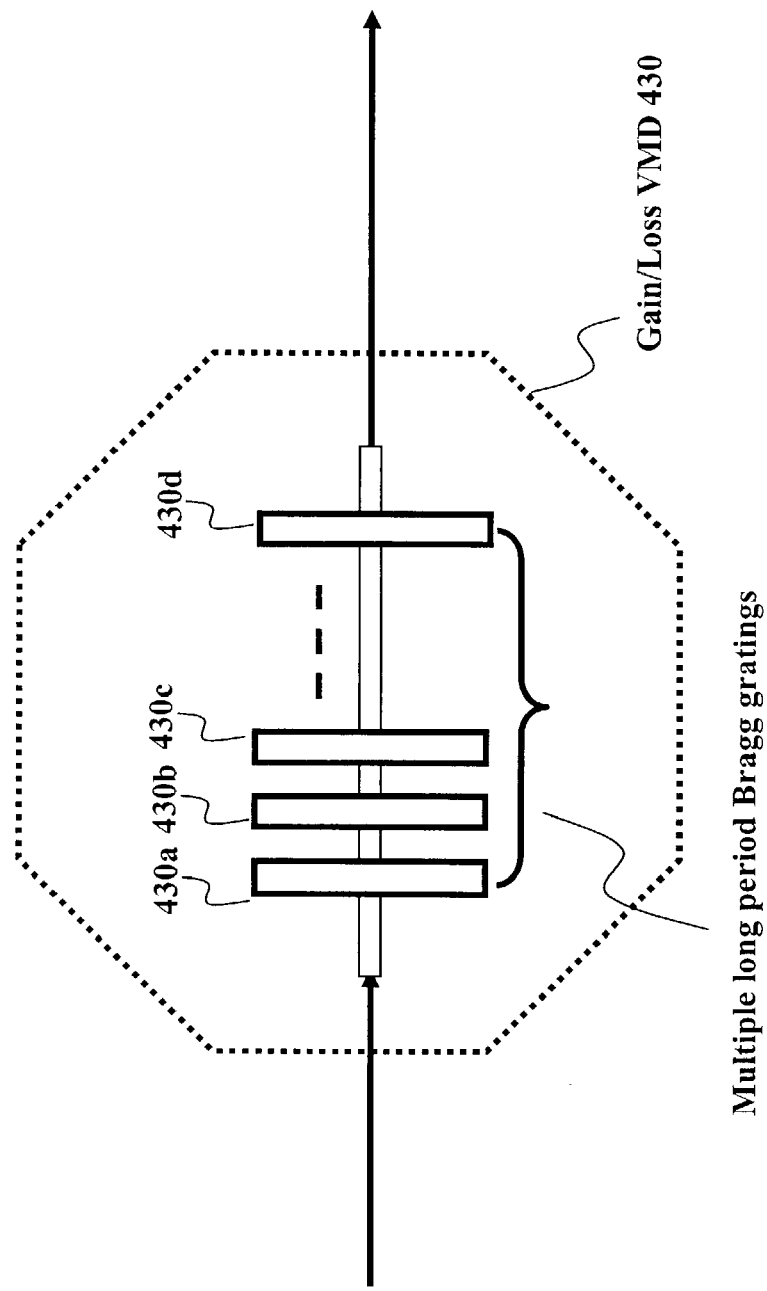
Figure 4C:
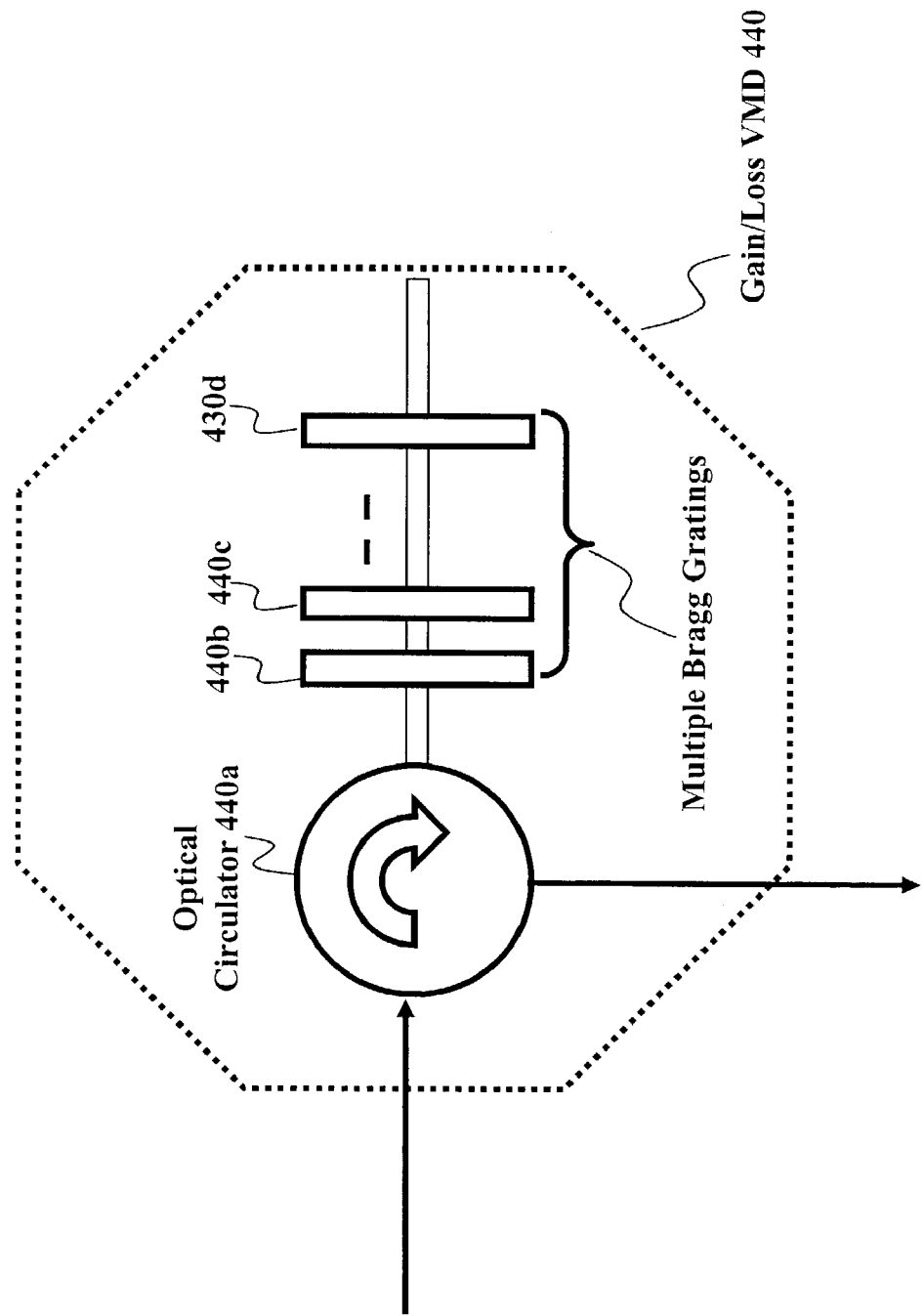
Figure 4D:
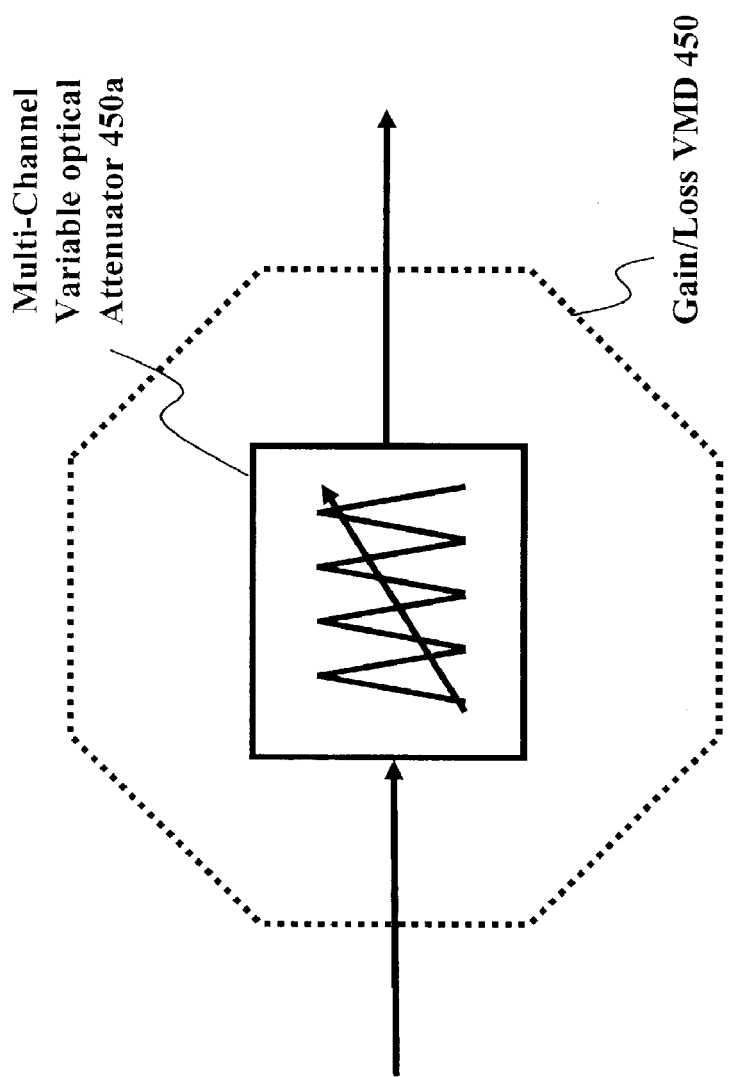

FIG. 3 depicts an exemplary architecture of an AB-optical amplifier 300, according to a second embodiment of the present invention. In this embodiment, a plurality of sub AB-optical amplifiers (sub AB-optical amplifier 1 320, . . . , sub AB-optical amplifier M 330) are deployed to amplify signals within different ranges of wavelength groups.

Each sub AB-optical amplifier is responsible for a different wavelength group. For example, the sub AB-optical amplifier 1 320 may amplify signals carried in channels within wavelength group 1 having wavelengths ($\lambda_{11}$, . . . , $\lambda_{1K}$), . . . , and the sub AB-optical amplifier M 330 may amplify signals carried in channels within wavelength group M having wavelengths ($\lambda_{M1}$, . . . , $\lambda_{ML}$).

Each sub AB-optical amplifier may be constructed, according to the first embodiment described above, using an amplifier and a gain/loss VMD. In FIG. 3, the sub AB-optical amplifier 1 320 includes an amplifier 320*a* and a gain/loss VMD 320*b*, . . . , the sub AB-optical amplifier M 330 includes an amplifier 330*a* and a gain/loss VMD 330*b*. While there may be a desired level of signal power for all wavelength groups, the gain/loss profiles used by the gain/loss VMDs for different wavelength groups may be individually adjusted according to the specific wavelengths involved in that group as well as the specific characteristics (e.g., gain profile) of the amplifier used.

To direct signals in different wavelength groups to appropriate sub AB-optical amplifiers, a wavelength division demultiplexer 310 is used to first demultiplex the input optical signal 110. Signals in each wavelength group are connected to its designated amplifier. For example, signals in wavelength group ($\lambda_{11}$, . . . , $\lambda_{1K}$) are directed to the amplifier 320*a*, . . . , signals in wavelength group ($\lambda_{M1}$, . . . , $\lambda_{ML}$) are directed to the amplifier 330*a*. To merge the individually amplified signals in different wavelength groups into a single optical signal, a wavelength division multiplexer 340 is applied to produce the output optical signal 140.

The amplifier and the gain/loss VMD used in previously described embodiments may be realized using different components known in the art. For instance, the amplifier can be realized using any one of, but is not limited to, an Erbium Doped Fiber Amplifier (EDFA), an Erbium Doped Waveguide Amplifier (EDWA), a Rare Earth Doped Fiber Amplifier (REDFA), a Raman amplifier, and/or a semiconductor amplifier.

FIGS. 4(*a*)–4(*d*) show different exemplary realizations of a gain/loss VMD. It should be appreciated by one skilled in the art that the following discussed realizations are merely illustrations instead of limitations. FIG. 4(*a*) shows an exemplary implementation of a gain/loss VMD 420 using a single long period Bragg grating 420*a*. With this implementation, the reflectivity of the long period Bragg grating 420*a* across wavelengths is adjusted to compensate for the variation in the gain.

FIG. 4(*b*) shows an exemplary implementation of a gain/loss VMD 430 using a multitude of long period Bragg gratings 430*a*, 430*b*, . . . , 430*d*. With this alternative, the reflectivity of each long period Bragg grating for each wavelength is adjusted to compensate the gain variation.

FIG. 4(*c*) shows an exemplary implementation of a gain/loss VMD 440 using a combination of a circulator 440*a* and a multitude of Bragg gratings 440*b*, 440*c*, . . . , 440*d*. The light (from the amplifier 120) travels through the circulator 440*a* and different wavelengths are reflected off multiple Bragg gratings according to certain reflectivities that are designed to offset the variation in amplitude gain.

As another exemplary alternative, FIG. 4(*d*) shows an implementation of a gain/loss VMD 450 using a multichannel variable optical attenuator 450*a*. The multi-channel VOA 450*a* is a de-multiplexer followed by a variety of individual VOAs followed by a multiplexer. The attenuation with respect to each channel may be adjusted to reduce the gain variation.

Other alternative implementations of the gain/loss VMD 450 include, but are not limited to, the use of a Raman amplifier, an REDFA, or a semiconductor amplifier with appropriate gain or loss profiles. The Raman amplifier may have gain capability only. That is, when a Raman amplifier is used to implement the gain/loss VMD 450, it can reduce the gain variation by compensating the gain with respect to wavelength channels that have less gain during the amplification. Both an REDFA and a semiconductor amplifier may have both gain and loss capabilities.

With each alternative implementation, certain adjustments are made so that the gain/loss VMD is able to compensate the variation in gain. In some situations, such adjustments may be made dynamically. For example, the attenuation rate with respect to each channel of the multi-channel variable attenuator 450*a* may be tuned according to need. Similarly, the reflectivity of a Bragg grating for a single wavelength may be thermally or mechanically tuned so that, for example, the reflecting light is not aligned with the peak reflectivity of the grating. Using such tunable components, the behavior of a gain/loss VMD (e.g., 100, 300) may be dynamically controlled.

Figure 5:
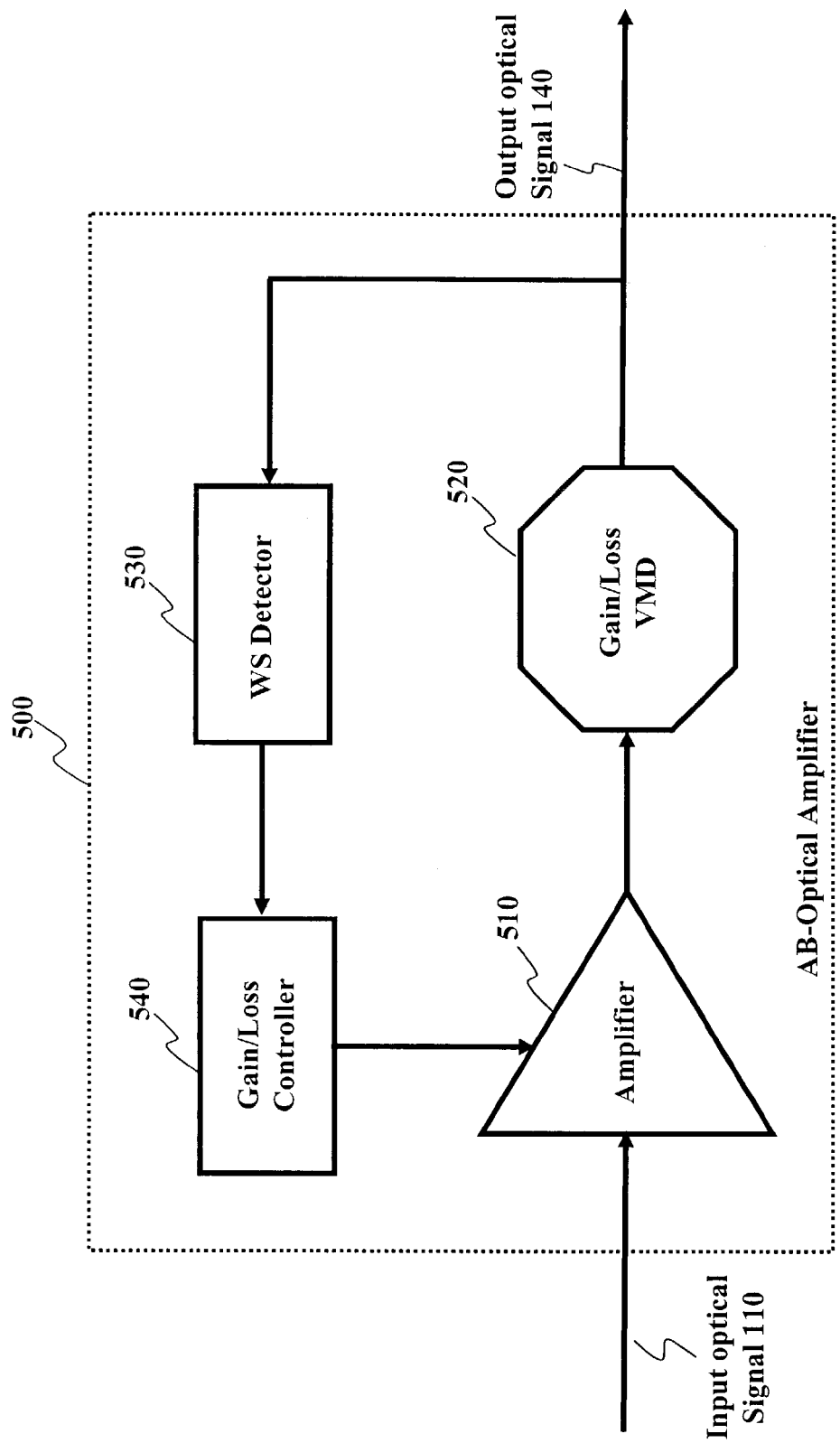
FIG. 5 depicts an exemplary architecture of an AB-optical amplifier with feedback control applied to an amplifier, according to a third embodiment of the present invention.

FIG. 5 depicts an exemplary architecture of an AB-optical amplifier 500 with feedback control, according to a third embodiment of the present invention. The AB-optical amplifier 500 comprises an amplifier 510, a gain/loss VMD 520, a wavelength sensitive (WS) detector 530, and a gain/loss controller 540. In this embodiment, the feedback control in the AB-optical amplifier 500 is applied to the amplifier 510.

The amplifier 510 operates in a similar fashion as described above except that its gain profile may be dynamically adjusted according to the detected power levels in the output optical signal 140. In practice, it is difficult to control the gain profile of the optical amplifier. One may obtain some fine tuning in this manner, while the VMDs provide the coarse gain/loss profile adjustments. From the output optical signal 140, the WS detector 530 measures the power of each wavelength of interest. The measurement related to the detected power with respect to each wavelength is used by the gain/loss controller 540 to produce adjustments to be made to the gain profile of the amplifier 510. The adjustments may be made according to, for example, a desired level of signal power. For example, if the detected power level of a wavelength is lower than the desired power level, the adjustment is made to increase the gain with respect to that wavelength.

Figure 6:
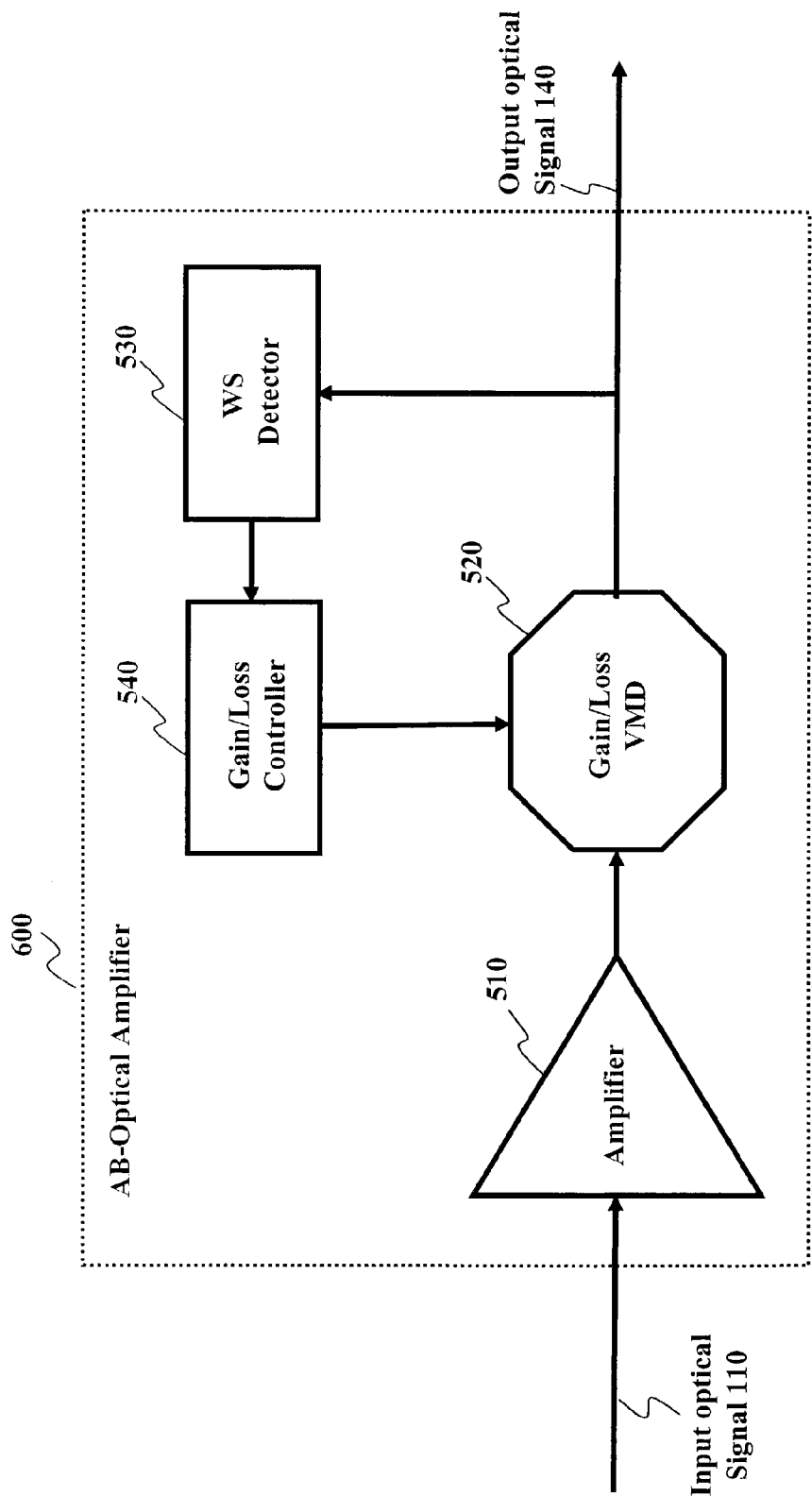
FIG. 6 depicts an exemplary architecture of an AB-optical amplifier with feedback control applied to a gain/loss VMD, according to a fourth embodiment of the present invention.

Feedback control may also be applied to the gain/loss VMD 520. This is shown in FIG. 6, according to a fourth embodiment of the present invention. According to this embodiment, the signal power for each wavelength is estimated from the output optical signal 140 (by the WS detector 530) and is used to generate adjustments (by the gain/loss controller 540) to be made to the gain/loss profile of the gain/loss VMD 520.

Figure 7A:
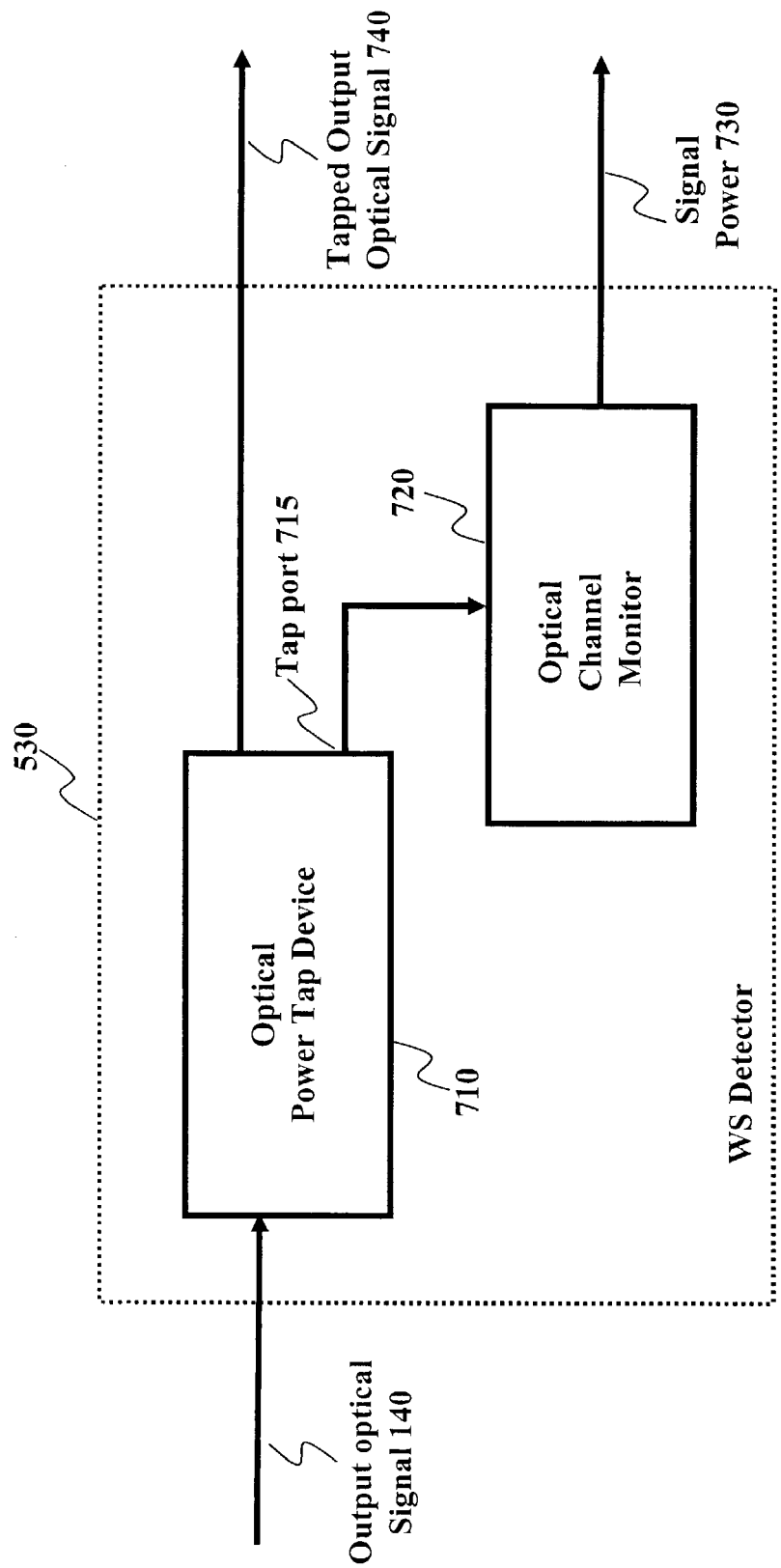
FIG. 7(a) illustrates an exemplary implementation of a wavelength sensitive (WS) detector, according to embodiments of the present invention.
Figure 7B:
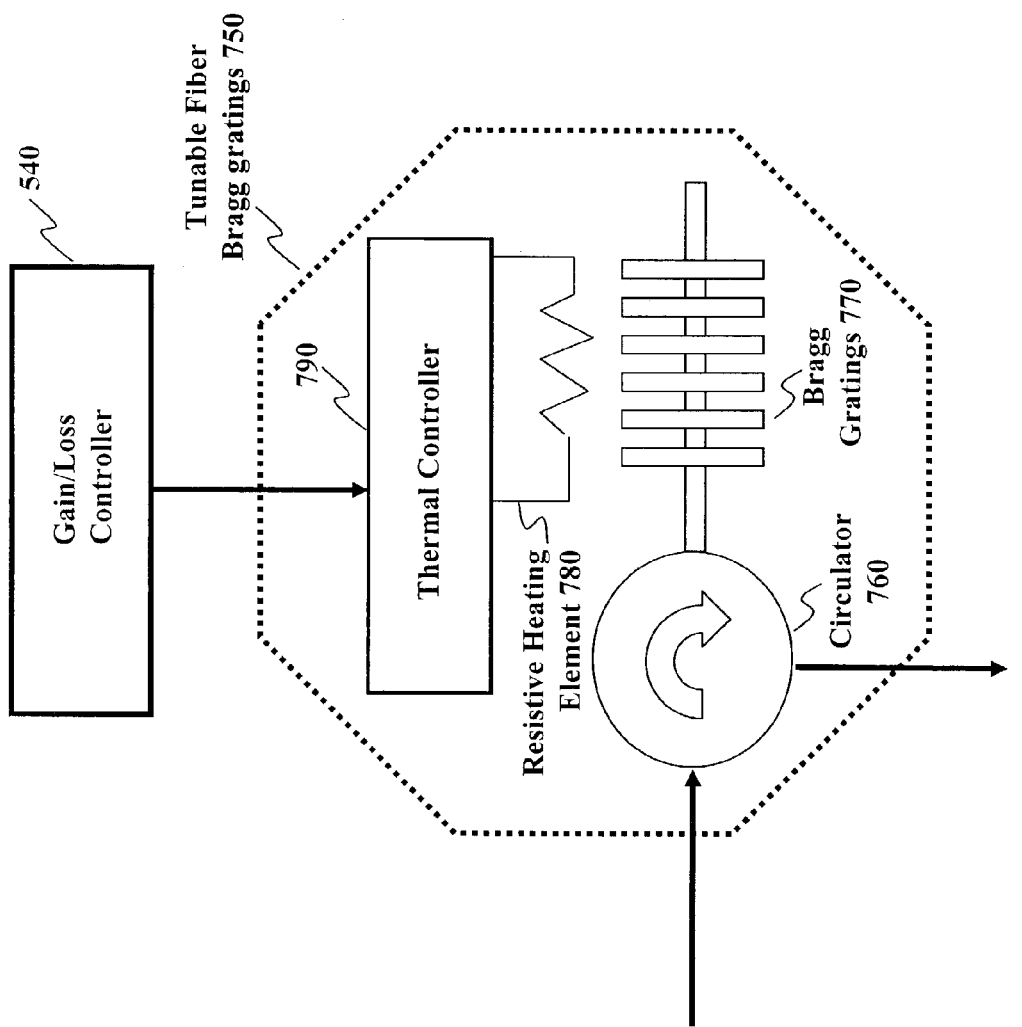
FIG. 7(b) illustrates an exemplary construct of a tunable gain/loss VMD with feedback control, according to embodiments of the present invention.

The WS detector 530 may be realized using different known techniques in the art. FIG. 7(*a*) illustrates an exemplary implementation of the WS detector 530, in which a combination of an optical power tap device 710 is used in conjunction with an optical channel monitor (OCM) 720 on the tap port. The optical power tap device 710 may be realized using an optical coupler. The OCM 720 may also be an optical spectrum analyzer, serving the function of a calibrated filter and a power meter.

With this mechanism, the optical power tap device 710 taps the output optical signal 140. For each wavelength, this produces two portions of the tapped signal, each having a certain percentage of the original power. One portion reaches a tap port 715 and is directed to the optical channel monitor 720. The optical channel monitor 720 then estimates the signal power level 730 for each of the wavelength channels. Other techniques may also be used to implement the WS detector 530.

As mentioned earlier, the amplifier (e.g., 120) and the gain/loss VMD (e.g., 130) may be realized using tunable components. When those components are dynamically adjustable, their performance may be controlled dynamically. The dynamic control is achieved via the gain/loss controller 540. Such dynamic control may be applied to the amplifier, the gain/loss VMD, or both. Depending on the specific implementation with respect to a component to which dynamic control is applied, the gain/loss controller 540 may be realized accordingly.

FIG. 7(*b*) illustrates the relationship between the gain/controller 540 and a tunable gain/loss VMD 750. In this illustration, the gain/loss VMD 750 is realized using a combination of a circulator 760 and a multitude of tunable Bragg gratings 770, a resistive heating element 780, and a thermal controller 790. The reflectivity of each Bragg grating for a single wavelength can be thermally tuned through the resistive heating element 780 which is controlled by the thermal controller 790. To effect the tuning, the gain/loss VMD 540 sends control information to the thermal controller 790 which subsequently controls the resistive heating element 780 to change the temperature of the gratings and, then, ultimately the reflectivity of the gratings. A separate heating element may also be used to tune each Bragg grating (not shown).

There are other alternatives in terms of the implementation of the gain/loss controller 540. For instance, bulk grating pairs may be coupled with a spatial light modulator (e.g., liquid crystal gate array) (not shown). The bulk grating pairs are used to spatially separate the wavelengths and the spatial light modulator is used to modulate the power of each wavelength. The VMDs are not limited to the above-specified examples. For example micro-electro-mechanical devices (MEMS) may also be used.

Figure 8:
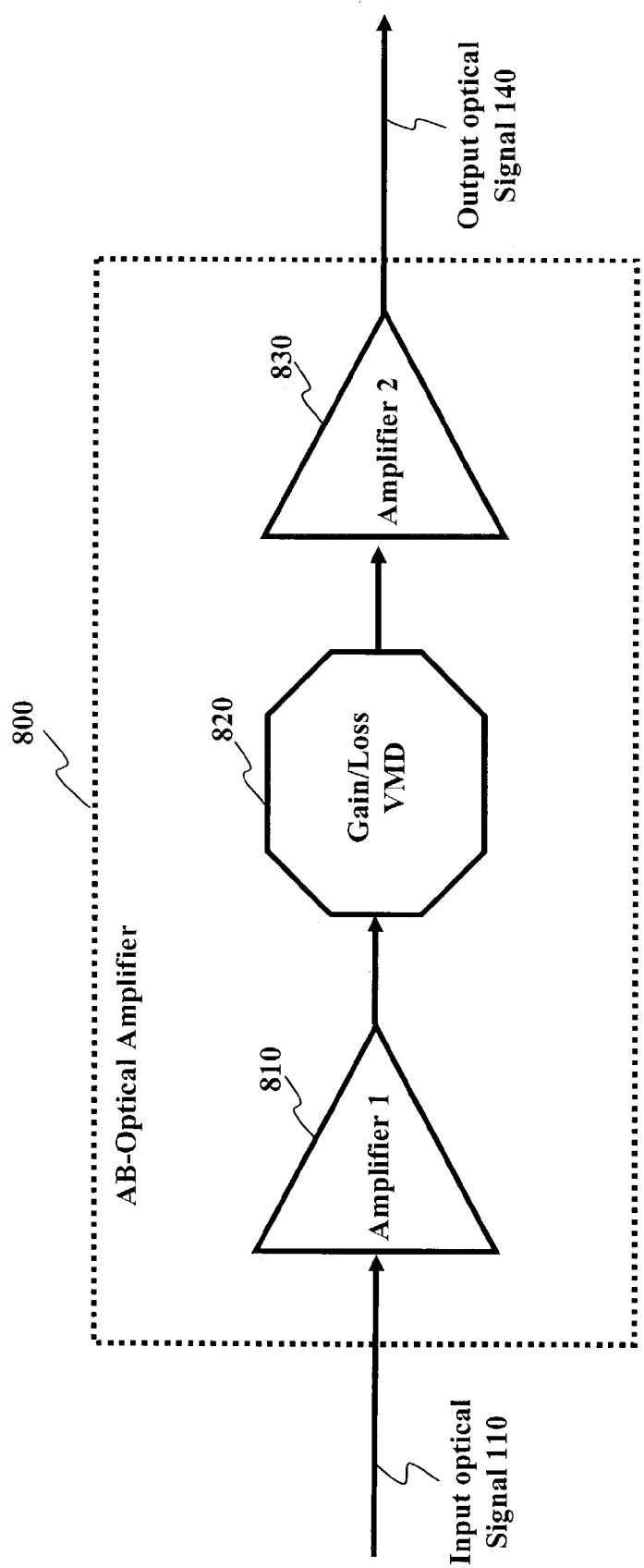
FIG. 8 depicts an exemplary architecture of an AB-optical amplifier with dual amplifiers, according to a fifth embodiment of the present invention.

FIG. 8 depicts an exemplary architecture of an AB-optical amplifier 800, according to a fifth embodiment of the present invention. The AB-optical amplifier 800 comprises dual amplifiers (an amplifier 1 810 and an amplifier 2 830) and a gain/loss VMD 820. In this embodiment, the amplifier 1 810 performs amplification on the input optical signal 110 (which may have a low power) prior to gain variation modification (performed by the gain/loss VMD 820). The signal to noise degradation caused by the loss in the gain/loss VMD 820 is then compensated by the amplifier 2 830. In addition, during gain variation modification, the gain/loss VMD 820 simultaneously compensates both the wavelength dependent amplitude gain of the amplifier 1 810 and that of the amplifier 2 830.

Each of the two amplifiers (810, 830) has its own independent gain profile. The compound gain profile achieved by two amplifiers together may form the basis for determining the gain/loss profile of the gain/loss VMD 820. That is, whether the gain/loss VMD 820 is to introduce a certain level of a gain or a loss at a particular frequency may depend on the level of the compound gain achieved by both amplifiers. More than two amplifiers may also be used. In this case, the compound gain may correspond to the total gain achieved by all the amplifiers used.

Figure 9:
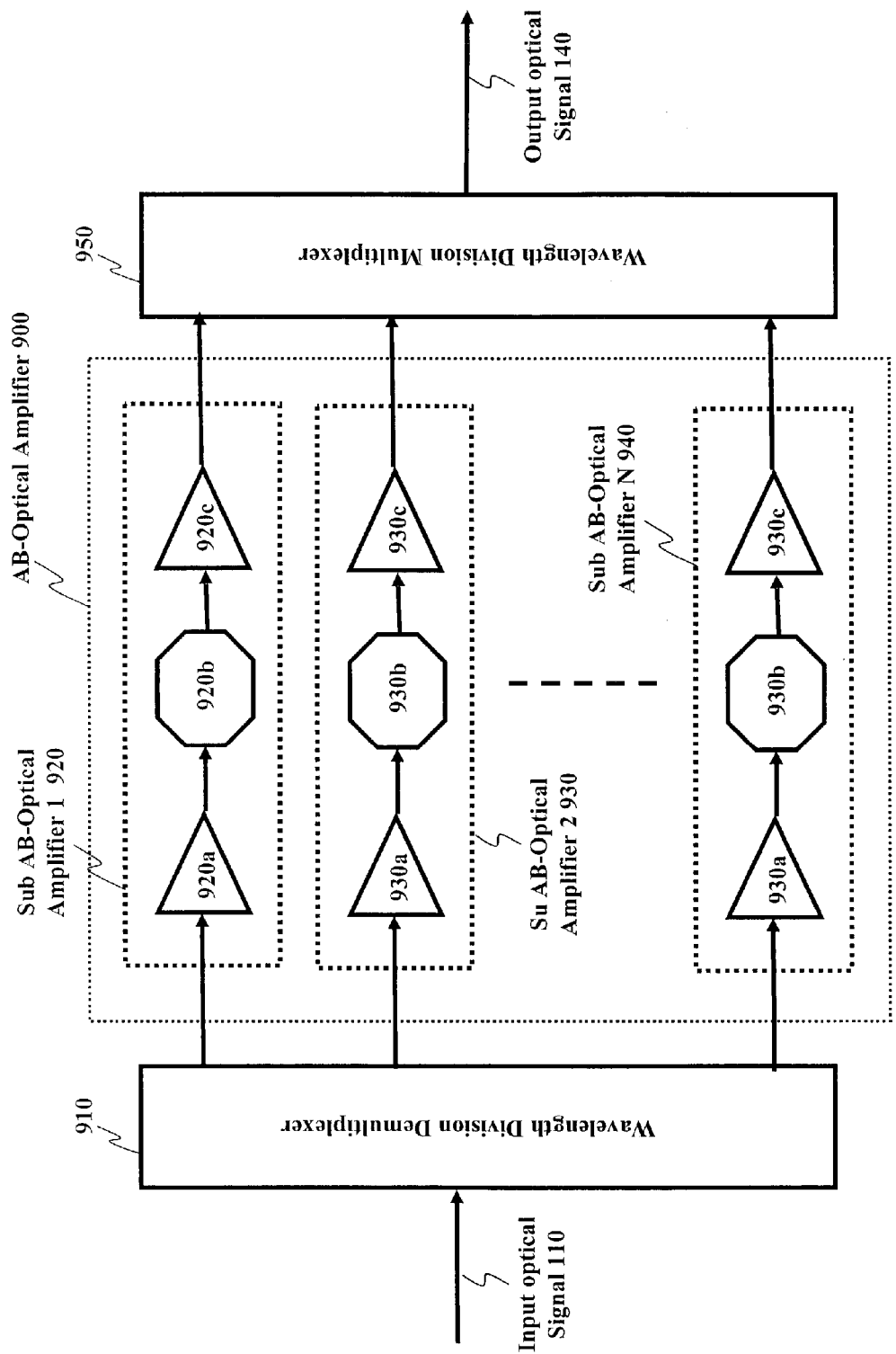
FIG. 9 depicts an exemplary architecture of an AB-optical amplifier, according to a sixth embodiment of the present invention.

A plurality of the AB-optical amplifiers constructed according to embodiment 800 may be used as sub AB-optical amplifiers in parallel to construct an AB-optical amplifier that handles an input optical signal with a large number of wavelength channels. FIG. 9 depicts an exemplary architecture of an AB-optical amplifier 900, according to a sixth embodiment of the present invention. The AB-optical amplifier 900 comprises a wavelength division demultiplexer 910, a plurality of sub AB-optical amplifiers (a sub AB-optical amplifier 1 920, a sub AB-optical amplifier 2 930, . . . , a sub AB-optical amplifier N 940), and a wavelength division multiplexer 950.

Each sub AB-optical amplifier is responsible for a different wavelength group: the sub AB-optical amplifier 1 920 may amplify signals carried in channels within wavelength group 1 having wavelengths ($\lambda_{11}$, . . . , $\lambda_{1K}$), the sub AB-optical amplifier 1 930 may amplify signals carried in channels within wavelength group 1 having wavelengths ($\lambda_{21}, \ldots, \lambda_{2K}$), ..., and the sub AB-optical amplifier N 940 may amplify signals carried in channels within wavelength group N having wavelengths ($\lambda_{N1}, \ldots, \lambda_{NL}$).

Each sub AB-optical amplifier comprises dual amplifiers and a gain/loss VMD. The sub AB-optical amplifier 1 920 includes a first amplifier 920a, a gain/loss VMD 920b, and a second amplifier 920c; the sub AB-optical amplifier 2 930 includes a first amplifier 930a, a gain/loss VMD 930b, and a second amplifier 930c; ..., the sub AB-optical amplifier N 940 includes a first amplifier 940a, a gain/loss VMD 940b, and a second amplifier 940c.

The gain/loss profiles used by the gain/loss VMDs for different wavelength groups may be individually adjusted according to the specific wavelengths involved in that group as well as the specific characteristics (e.g., gain profiles) of the amplifiers used.

To direct signals in different wavelength groups to appropriate sub AB-optical amplifiers, the wavelength division demultiplexer 910 demultiplexes the input optical signal 110. Signals in each wavelength group are directed to its corresponding sub AB-optical amplifier. For example, signals in wavelength group ($\lambda_{11}, \ldots, \lambda_{1K}$) are directed to the amplifier 920a, ..., signals in wavelength group ($\lambda_{N1}, \ldots, \lambda_{NL}$) are directed to the amplifier 940a. To merge the individually amplified signals in different wavelength groups into a single optical signal, the wavelength division multiplexer 950 multiplexes signals from different wavelength groups to produce the output optical signal 140.

Figure 10:
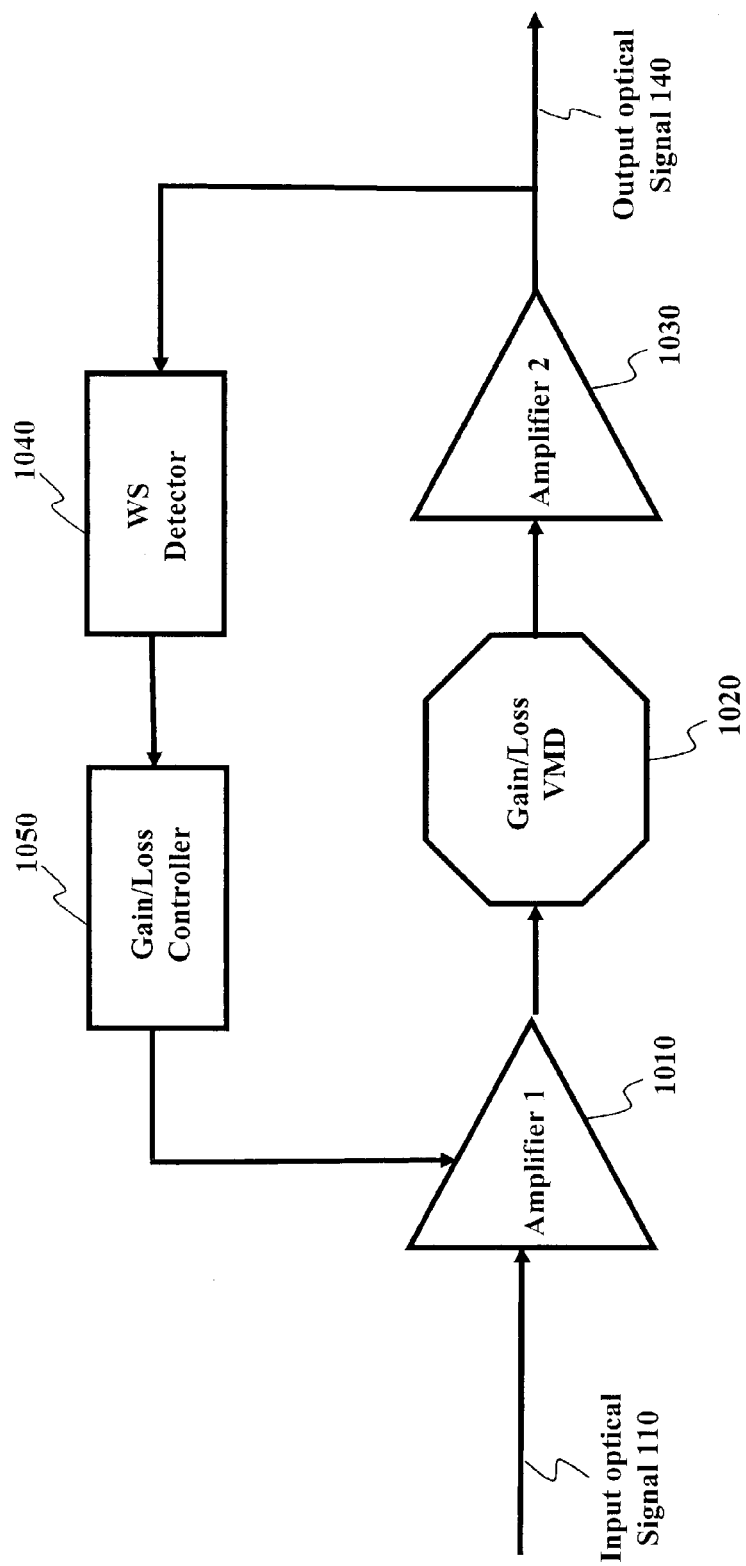
FIG. 10 depicts an exemplary architecture of an AB-optical amplifier with feedback control applied to a first amplifier, according to a seventh embodiment of the present invention.
Figure 11:
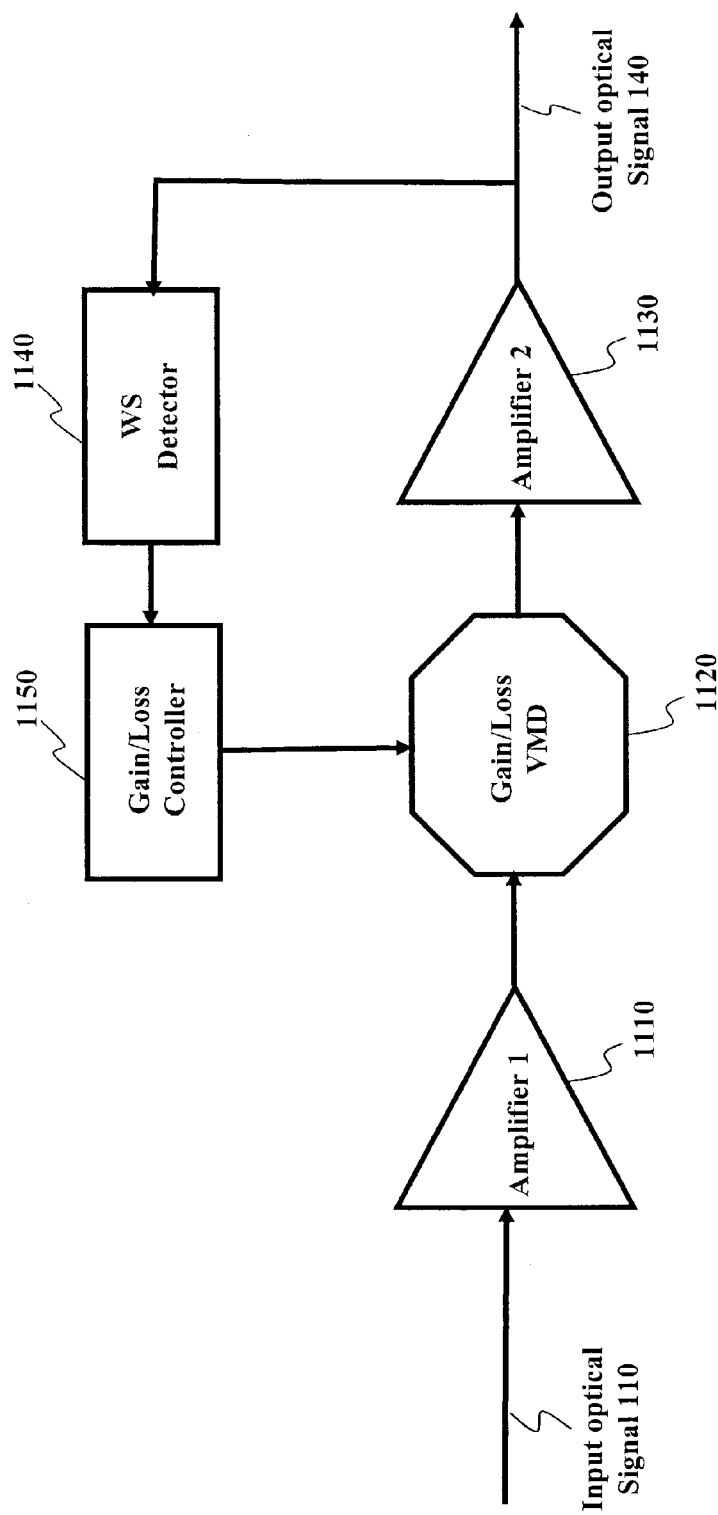
FIG. 11 depicts an exemplary architecture of an AB-optical amplifier with feedback control applied to a gain/loss VMD, according to an eighth embodiment of the present invention.
Figure 12:
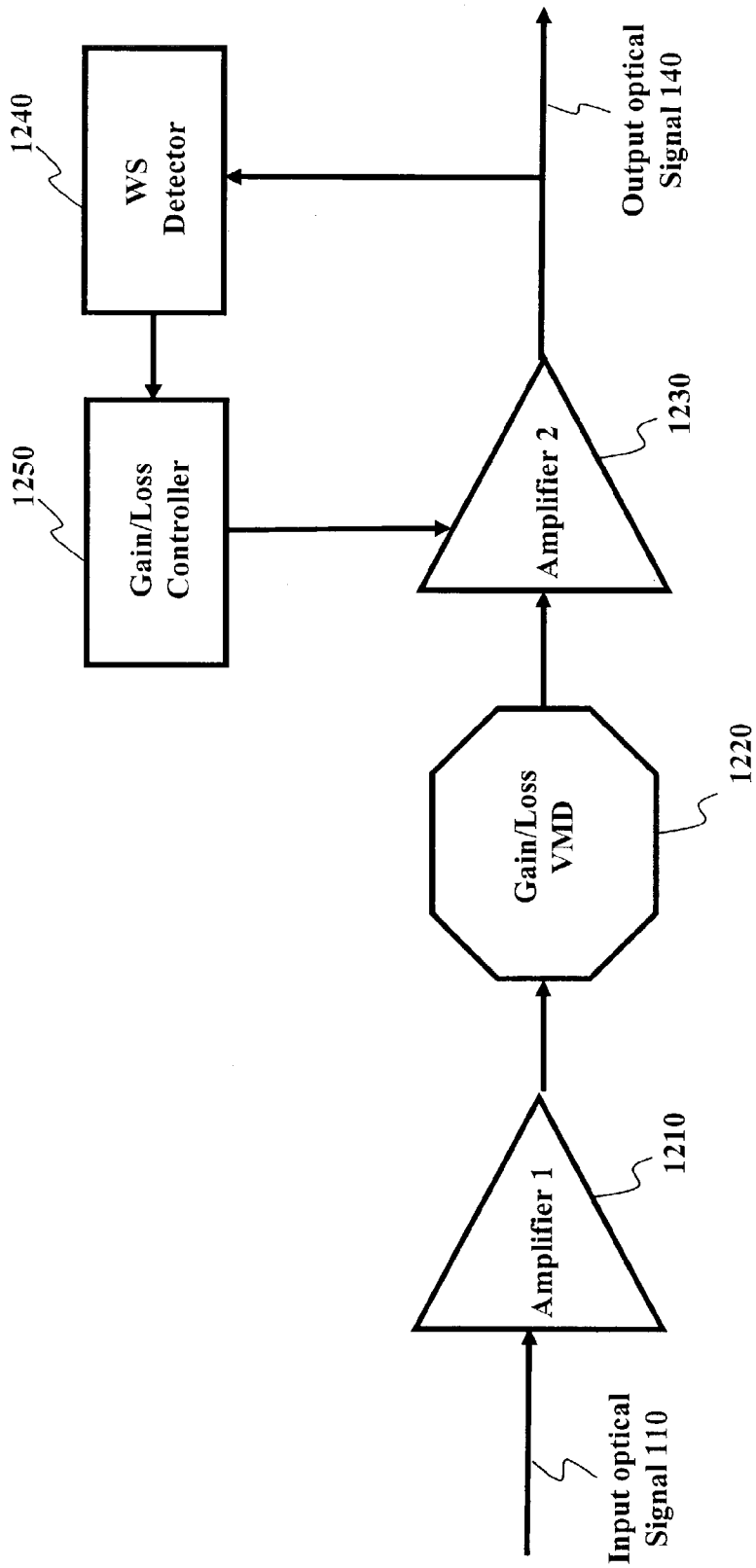
FIG. 12 depicts an exemplary architecture of an AB-optical amplifier with feedback control applied to a second amplifier, according to a ninth embodiment of the present invention.

Feedback control can be similarly applied to an AB-optical amplifier constructed according to embodiment 800. FIGS. 10–12 depict different exemplary architectures of an AB-optical amplifier with dual amplifiers and feedback control. FIG. 10 depicts an exemplary architecture of an AB-optical amplifier 1000 with feedback control applied to the first of its dual amplifiers, according to a seventh embodiment of the present invention. As we noted above in regard to FIG. 5, it is difficult to control the gain profile of the optical amplifier in practice. One may obtain some fine tuning in this manner, while the VMDs provide the coarse gain/loss profile adjustments.

The AB-optical amplifier 1000 comprises a first amplifier 1010, a gain/loss VMD 1020, a second amplifier 1030, a WS detector 1040, and a gain/loss controller 1050. The input optical signal is processed along the pipeline of the first amplifier 1010, the gain/loss VMD 1020, and the second amplifier 1030 in a similar fashion as described above. The output optical signal 140 from the second amplifier 1030 is fed to the WS detector 1040.

The WS detector 1040 estimates the power level of each wavelength. The estimated power for each wavelength is then used, by the gain/loss controller 1050 to generate control information to adjust the gain profile of the first amplifier 1010.

FIG. 11 depicts an exemplary architecture of an AB-optical amplifier 1110 with feedback control applied to its gain/loss VMD, according to a ninth embodiment of the present invention. The AB-optical amplifier 1110 has a similar construct as that of the AB-optical amplifier 1010 except that the feedback control here is applied to the gain/loss VMD 1120. Depending on the specific implementation of the gain/loss VMD 1120, the gain/loss controller 1150 may be implemented differently from that of the gain/loss controller 1050.

FIG. 12 depicts an exemplary architecture of an AB-optical amplifier 1210 with feedback control applied to the second amplifier, according to a ninth embodiment of the present invention. The AB-optical amplifier 1210 also has a similar construct as that of the AB-optical amplifier 1010 except that the feedback control here is applied to the second amplifier 1230 of the dual amplifiers 1210 and 1230. Depending on the specific implementation of the second amplifier 1230, the gain/loss controller 1250 may be implemented differently from that of the gain/loss controller 1050. As we noted above in regard to FIGS. 5 and 10, it is difficult to control the gain profile of the optical amplifier in practice. One may obtain some find tuning in this manner, while the VMDs provide the coarse gain/loss profile adjustments.

In certain situations, the feedback control may be alternatively applied to more than one component (not shown in Figures). For example, if one component operates at a high speed while the other operates at a low speed, the feedback control may be imposed on both. In a different scenario, when one component performs a general slope compensation and another performs a fine and channel to channel adjustments, the feedback control may also be applied to the components that operate in somewhat different spheres.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. An amplitude balanced (AB) optical amplifier, comprising:

an optical preamplifier; and a gain/loss variation modification device (VMD) in optical communication with said preamplifier, wherein said optical preamplifier has a gain profile adapted to amplify a wavelength division multiplexed optical signal comprising a plurality of wavelength channels in which at least one of said plurality of wavelength channels includes a multilevel encoded signal to produce an amplified optical signal having a gain variation across said plurality of wavelength channels, and wherein said gain/loss variation modification device is constructed to modify said amplified optical signal across said plurality of wavelength channels, said gain/loss modification device having a gain/loss profile substantially complementary to said gain variation of said optical preamplifier so as to at least partially cancel said gain variation introduced by said optical preamplifier, wherein said at least one of said plurality of wavelength channels includes a hybrid signal comprising at least one multilevel signal and at least one on-off-keyed signal.

2. The optical amplifier according to claim 1, wherein the preamplifier comprises at least one of:

an Erbium Doped Fiber Amplifier (EDFA);

an Erbium Doped Waveguide Amplifier (EDWA);

a Raman amplifier;

a Rare Earth Doped Fiber Amplifier (REDFA); and a semiconductor amplifier.

3. The optical amplifier according to claim 1, wherein the gain/loss VMD comprises at least one of:
   a long period Bragg grating;
   a plurality of long period Bragg gratings;
   a multichannel variable optical attenuator;
   a combination of a circulator and a plurality of Bragg gratings;
   a micro-electro-mechanical device;
   a Raman amplifier operating based on a gain profile that is complementary to the gain profile of the preamplifier;
   an REDFA operating based on a gain/loss profile that is complementary to the gain profile of the preamplifier; and
   a semiconductor amplifier operating based on a gain/loss profile that is complementary to the gain profile of the preamplifier.

4. The optical amplifier according to claim 1, further comprising:
   a wavelength sensitive detector capable of detecting the signal power of each wavelength in an output optical signal; and
   a gain/loss feedback controller capable of performing feedback control based on a detected signal power of the output optical signal.

5. The optical amplifier according to claim 4, wherein the gain/loss feedback controller controls the gain/loss of at least one of:
   said preamplifier; and said gain/loss VMD.

6. The optical amplifier according to claim 4, wherein the wavelength sensitive detector comprises:
   an optical power tap device capable of tapping the output optical signal to produce two portions for each wavelength, each of which having a certain percentage of signal power; and
   an optical channel monitor capable of determining the signal power of each wavelength of the output optical signal based on one portion of the tapped output optical signal.

7. The optical amplifier according to claim 6, wherein the optical power tap device is realized using an optical coupler.

8. An amplitude balanced (AB) optical amplifier, comprising:
   an optical preamplifier;
   a gain/loss variation modification device (VMD) in communication with said optical preamplifier; and
   an optical post-amplifier in communication with the gain/loss variation modification device, wherein
   said optical preamplifier has again profile adapted to amplify a wavelength division multiplexed optical signal comprising a plurality of wavelength channels in which at least one of said plurality of wavelength channels includes a multilevel encoded signal to produce a pre-amplified optical signal having a gain variation across said plurality of wavelength channels,
   said gain/loss variation modification device is constructed to modify said pre-amplified optical signal across said plurality of wavelength channels, said gain/loss modification device having a gain/loss profile substantially complementary to said gain variation of said optical preamplifier so as to at least partially cancel said gain variation to produce a modified optical signal, and
   said optical post-amplifier is adapted to amplify the modified optical signal to produce an output optical signal, wherein
   said at least one of said plurality of wavelength channels includes a hybrid signal comprising at least one multilevel signal and at least one on-off-keyed signal.

9. The optical amplifier according to claim 8, wherein said optical preamplifier has a first gain profile and said optical post-amplifier has a second gain profile.

10. The optical amplifier according to claim 9, wherein the gain/loss VMD comprises at least one of:
    a long period Bragg grating;
    a plurality of Bragg gratings;
    a multichannel variable optical attenuator;
    a combination of a circulator and a plurality of Bragg gratings;
    a Raman amplifier operating based on a gain profile that is complementary to a compound gain profile achieved together by the optical preamplifier according to the first gain profile and the optical post-amplifier according to the second gain profile;
    an REDFA operating based on a gain/loss profile that is complementary to the compound gain profile; and
    a semiconductor amplifier operating based on a gain/loss profile that is complementary to the compound gain profile.

11. The optical amplifier according to claim 8, wherein said optical preamplifier comprises at least one of:
    an Erbium Doped Fiber Amplifier (EDFA);
    an Erbium Doped Waveguide Amplifier (EDWA);
    a Raman amplifier;
    a Rare Earth Doped Fiber Amplifier (REDFA); and
    a semiconductor amplifier.

12. The optical amplifier according to claim 8, wherein said optical post-amplifier comprises at least one of
    an Erbium Doped Fiber Amplifier (EDFA);
    an Erbium Doped Waveguide Amplifier (EDWA);
    a Raman amplifier;
    a Rare Earth Doped Fiber Amplifier (REDFA); and
    a semiconductor amplifier.

13. The optical amplifier according to claim 8, further comprising:
    a wavelength sensitive detector capable of detecting the signal power of each wavelength channel contained in the output optical signal; and
    a gain/loss feedback controller capable of performing feedback control based on the detected signal power for each wavelength channel contained in the output optical signal.

14. The optical amplifier according to claim 13, wherein the gain/loss feedback controller controls the gain/loss of at least one of:
    the optical preamplifier;
    the optical post-amplifier; and
    the gain/loss VMD.

15. The optical amplifier according to claim 13, wherein the wavelength sensitive detector comprises:
    an optical power tap device; and
    an optical channel monitor, wherein
    said optical power tap device is adapted to tap the output optical signal to produce two portions for each wavelength channel, each of which has a certain percentage of signal power, and
    said optical channel monitor is adapted to determine the signal power of each wavelength channel of the output optical signal based on one portion of the tapped output optical signal.

16. The optical amplifier according to claim 15, wherein the optical power tap device comprises an optical coupler.

17. An amplitude balanced optical amplifying mechanism, comprising:
- a wavelength division demultiplexer;
- a plurality of optical amplifiers in communication with the wavelength division demultiplexer; and
- a wavelength division multiplexer in communication with the plurality of optical amplifiers, wherein
- said wavelength division demultiplexer is adapted to demultiplex an input optical signal with multiple wavelength channels into different wavelength groups, each of the which comprises a plurality of wavelength channels and carries at least one multilevel encoded signal,
- said plurality of optical amplifiers are adapted to amplify optical signals contained in wavelength channels of different wavelength groups to produce amplified signals,
- said wavelength division multiplexer is adapted to multiplex the amplified signals from said plurality of optical amplifiers corresponding to different wavelength groups to produce an output optical signal,
- at least one of said optical amplifiers having
  - an optical preamplifier, and
  - a gain/loss variation modification device (VMD) in communication with the optical preamplifier, wherein
  - said optical preamplifier has a gain profile adapted to amplify a corresponding optical signal to produce a pre-amplified optical signal having a gain variation across said plurality of wavelength channels, and
  - said gain/loss variation modification device is constructed to modify said pre-amplified optical signal across said plurality of wavelength channels, said gain/loss modification device having a gain/loss profile substantially complementary to said gain variation of said optical preamplifier so as to at least partially cancel said gain variation introduced by said optical preamplifier, wherein
  - said at least one of said plurality of wavelength channels includes a hybrid signal comprising at least one multilevel signal and at least one on-off-keyed signal.

18. The optical amplifying mechanism according to claim 17, wherein each optical amplifier corresponding to a wavelength group further comprises:
- an optical post-amplifier in communication with the gain/loss modification device (VMD), wherein
- said optical post-amplifier is adapted to amplify the modified optical signals.

19. A method for amplitude balancing an optical signal, comprising:
- preamplifying said optical signal with a device having a wavelength-dependent gain characteristic; and
- varying a gain/loss characteristic of said preamplified signal with a gain/loss profile substantially complementary to said wavelength-dependent gain characteristic so as to at least partially cancel said gain variation introduced by said optical preamplifier,
- wherein said optical signal is a wavelength division multiplexed optical signal comprising a plurality of wavelength channels in which at least one of said plurality of wavelength channels includes a multilevel encoded signal, wherein
- said at least one of said plurality of wavelength channels includes a hybrid signal comprising at least one multilevel signal and at least one on-off-keyed signal.

20. An optical amplifying mechanism, comprising:
- means for preamplifying said optical signal with a device having a wavelength-dependent gain characteristic; and
- means for varying a gain/loss characteristic of said preamplified signal with a gain/loss profile substantially complementary to said wavelength-dependent gain characteristic so as to at least partially cancel said gain variation introduced by said optical preamplifier, wherein
- said optical signal is a wavelength division multiplexed optical signal comprising a plurality of wavelength channels in which at least one of said plurality of wavelength channels includes a multilevel encoded signal, wherein
- said at least one of said plurality of wavelength channels includes a hybrid signal comprising at least one multilevel signal and at least one on-off-keyed signal.

* * * * *